United States Patent [19]

Neal, Jr. et al.

[11] 4,383,061

[45] May 10, 1983

[54] EPOXY SMOOTHING COMPOUND

[75] Inventors: Jesse R. Neal, Jr., Panama City, Fla.; Henry R. Bleile, Bowie, Md.; Truman W. Humphries, Napa, Calif.

[73] Assignee: The United States of America as represented by the Secretary of the Navy, Washington, D.C.

[21] Appl. No.: 277,453

[22] Filed: Jun. 25, 1981

[51] Int. Cl.$^3$ .............................................. C08L 63/02
[52] U.S. Cl. .................................... 523/458; 523/466
[58] Field of Search .................. 260/37 EP; 523/458, 523/466

[56] References Cited

U.S. PATENT DOCUMENTS

| | | | |
|---|---|---|---|
| 3,449,274 | 6/1969 | Salensky | 260/37 EP |
| 3,823,107 | 7/1974 | Cotton | 260/23.7 N |
| 4,031,048 | 6/1977 | Holmen et al. | 260/37 EP |
| 4,128,525 | 12/1978 | Yeakey et al. | 1260/37 EP |

Primary Examiner—Lewis T. Jacobs
Attorney, Agent, or Firm—R. S. Sciascia; Charles D. B. Curry; William C. Daubenspeck

[57] ABSTRACT

A coating for smoothing rough surfaces of steel, masonry, and concrete having desirable application and curing characteristics comprising component A and component B in a ratio of 4:5 to 5:4 by weight. Component A includes by weight, polyamide adduct resin of 45–54%, polyamide resin of 3–4%, thixotrope additive of 12–24%, titanium dioxide pigment of 5–6%, and magnesium silicate pigment of 34–38%. Component B includes by weight, epoxy resin of 55–60%, thixotrope additive of 10–20%, colorant pigment of 3–4%, and magnesium silicate pigment of 31–35%.

2 Claims, 3 Drawing Figures

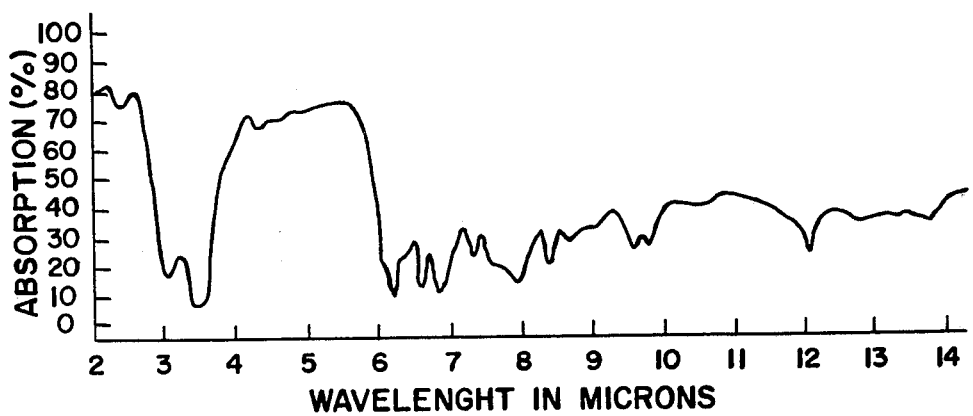
FIG_1
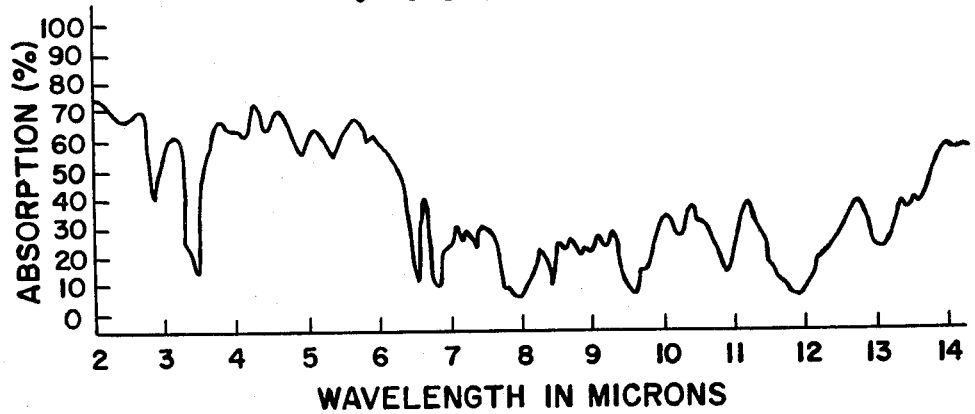
FIG_2
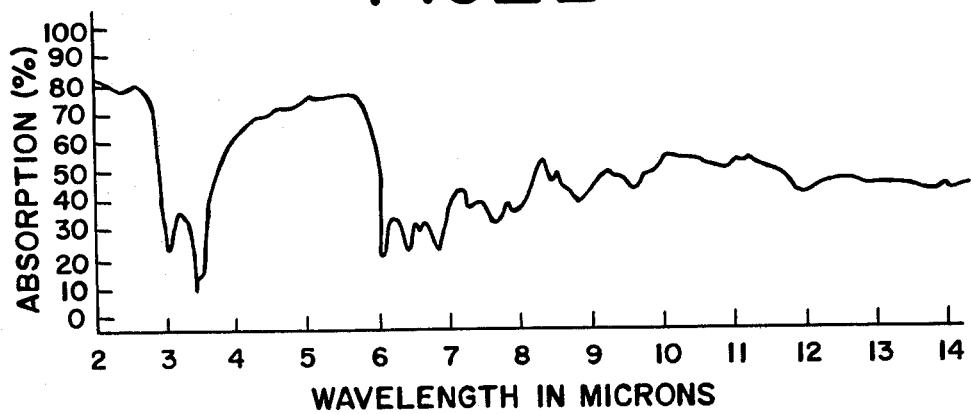
FIG_3

EPOXY SMOOTHING COMPOUND

BACKGROUND OF THE INVENTION

1. Field of the Invention

The present invention relates generally to polyamide-epoxy coating compositions and, more particularly, to a polyamide-epoxy coating composition for smoothing rough surfaces of steel, masonry, and concrete.

2. Description of Prior Art

An important use of polyamide-epoxy coatings is that of smoothing coatings for smoothing rough steel, concrete, and masonry surfaces. A particularly demanding use is for smoothing the surface of the steel hulls of ships. This requires a coating which may be applied to fill in deep pits or crevices or general unevenness. The coating should be suitable for application in thicknesses of one mil to one-half inch without slumping or sagging. The large surface areas involved require that it be easily applied or easily spreadable. The coating should be suitable for mixing and dispensing by automatic mixing and proportioning equipment and application by spray equipment or by trowel. The curing characteristics should be tolerant to varying temperatures so that it retains a moderate curing time for a wide range of temperatures.

Presently available commercial polyamide-epoxy coatings are not completely satisfactory in fulfilling the foregoing requirements. Those that can be applied without slumping or sagging tend to be very difficult to spread and not be suitable for automatic mixing and proportioning equipment. The curing times tend to vary more than desired with variations in temperature.

SUMMARY OF THE INVENTION

The present invention is a polyamide-epoxy coating composition formulated for smoothing rough steel, concrete and masonry surfaces which overcomes the just-described disadvantages of the prior coatings. The coating composition is formed by mixing component A and component B in a ratio of from 4:5 to 5:4 by weight. Component A is prepared by dispersing, by weight, 48–54% polyamide adduct resin, 3–4% polyamide resin, 12–24% thixotrope additive, 5–6% titanium dioxide, and 34–38% magnesium silicate. Component B is prepared by dispersing, by weight, 55–66% epoxy resin, 10–20% thixotrope additive, 2–4% colorant pigment, and 31–35% magnesium silicate.

A more complete description of the present invention is to be found in the following detailed description of the invention when considered in conjunction with the accompanying drawing.

BRIEF DESCRIPTION OF THE DRAWINGS

FIG. 1 is a graph showing the infrared absorbance spectrum of the type of epoxy resin used as an ingredient in the smoothing compound of the present invention;

FIG. 2 is a graph showing the infrared absorbance spectrum of the type of polyamide adduct resin used as an ingredient in the smoothing compound of the present invention; and FIG. 3 is a graph showing the infrared absorbance spectrum of the type of polyamide resin used as an ingredient in the smoothing compound of the present invention.

DESCRIPTION OF THE PREFERRED EMBODIMENT

The smoothing compound of the present invention is the dispersion of a first component A and a second component B. Component A includes the following ingredients in the accompanying percentages by weight:

| Polyamide Adduct Resin | 48–54% |
|---|---|
| Polyamide Resin | 3–4 |
| Thixotrope Additive | 12–24 |
| Titanium Dioxide Pigment | 5–6 |
| Magnesium Silicate Pigment | 34–38 |

Component B includes the following ingredients in the accompanying percentages by weight:

| Epoxy Resin | 55–60% |
|---|---|
| Thixotrope Additive | 10–20 |
| Colorant Pigment | 2–4 |
| Magnesium Silicate Pigment | 31–35 |

Component A and component B may be mixed in ratios from 5:4 to 4:5 by weight to achieve the desired properties for smoothing of rough steel, masonry and concrete surfaces.

Turning now to consider the ingredients of component A in more detail, a polyamide adduct resin suitable for use in the present invention may be identified by an infrared absorbance spectrum as shown in FIG. 2. The spectrum of FIG. 2 and the spectrums of FIGS. 1 and 3 are made in accordance with the ASTM (American Society for Testing and Materials) E168, "General Techniques of Infrared Quantitative Analysis". A spectral interval of 12.5 to 2 microns is appropriate on a solution of 5% sample in chloroform in a sodium chloride cell with a 0.1 mm path length and a chloroform reference. Suitable polyamide adducts are commercially available, several examples (identified by tradenames) being "Versemid 380 B75", from General Mills, Inc., "Unirey 2180 B75" from Union Camp, "Azamide 680 B75" from AZ Products, "Ancamine 700 B75", from Pacific Anchor Chemical Corp. and "Epotuf SF 7792" from Reichold Chemicals, Inc. Generally speaking, a suitable polyamide adduct may be formed by reacting a polyamide resin with an epoxy resin as described in U.S. Pat. No. 3,139,437.

The type of polyamide resin suitable for use in component A is identified by the infrared absorbance spectrum shown in FIG. 3. Suitable polyamide resins are commercially available (identified by tradenames) including "Genamide 2000" from General Mills, Inc., "Unirez 2810" from Union Camp, "Azamide 600" from AZ Products, "Ancamine 507" from Pacific Anchor Chemical Corp., and "Epotuf SF 7791" from Reichold Chemicals, Inc. A suitable polyamide is also disclosed in the aforementioned U.S. Pat. No. 3,139,437 which describes an aminopoly-imidazoline-amide with three imidazoline groups, one amide linkage, and two primary amine groups.

The titanium dioxide pigment serves as a hiding agent and the magnesium silicate pigment functions as a filler and reinforcing pigment. A suitable titanium dioxide resin is "Tepure R960" from DuPont and a suitable magnesium silicate is "Talc CP20-30" from Pfizer.

The thixotrope additive is a bodying agent to keep the compound from sagging and may be hydrogenated castor oil. A suitable thixotrope additive is commercially available under the tradename "Thixatrol ST" from N. L. Industries.

Turning now to the ingredients in component B, an epoxy resin of the type suitable for use in component B is identified by the infrared absorbance spectrum shown in FIG. 1. Suitable epoxy resins are commercially available, several examples (identified by tradenames) being "Epon 828" from Shell Chemical Co., "Araldite 6010" from Ciba-Geigy, "DER 331" from Dow Chemical, "Azepoxy 128" from AZ Products, "Epo-Tuf 37-140" from Reichold Chemicals, Inc., and "Epi-Rez 510" from Celanese Corp. Epoxy resins, useful in the practice of this invention, may be characterized as being a series of condensation reaction products of epichlorohydrin and bisphenol-A wherein epechlorohydrin may be, illustrated by the general formula, $CH_2-O-CH-CH_2-CL$ and bisphenol-A by the general formula, $(CH_3)_2 C(C_6H_4OH)_2$.

The epoxy, useful in practicing the present invention, are of the thermal epoxy groups known as epoxy resins, and the different epoxy resins differ from one another in molecular weight. It has been postulated that the structural formula of these epoxy resins is as follows:

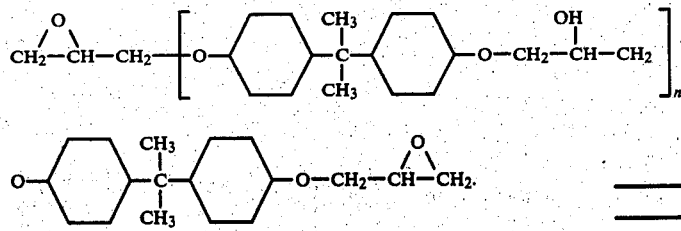

Reference is also made to U.S. Pat. No. 3,139,437 for a description of a suitable epoxy for use with the present invention.

The colorant pigment of component B may be of any number of well known and commercially available pigments depending on the desired color of the coating. For example, the colorant pigment may be carbon black (such as "Pfizer M1011"), copper phihalocyanine blue (such as "DuPont BT-417D"), yellow iron oxide (such as "Pfizer YO-3587"), or red iron oxide (such as "Pfizer RO-6097") or combinations thereof. The thixotrope and magnesium silicate included in component B have been described previously in connection with their use in component A.

The smoothing compound is prepared by first preparing components A and B. Each component A and B is prepared by dispersing the ingredients with a high speed (5000 rpm) disperser. The thixotrope is first dispersed in the resin of each component followed by the pigments. During dispersion of the thixotrope in each component, the dispersion should be continued until the mixture is heated to 140°-150° F. by the high-speed mixing process. After the addition of the pigments, dispersion should be continued until a minimum fineness of grind of 5 on the Hegmas Scale is reached. During the dispersion the material should be cooled as necessary to keep the temperature under 145° F. The components should then be cooled to 60°-70° F. for 24 hours before packaging or use.

The viscosity, sag resistance, dispersing and application properties may be adjusted by varying the amount of thixotrope. Thin materials may be obtained with 10% thixotrope and thick materials with 20% thixotrope in the components.

Component A and component B may be mixed in ratios from 5:4 to 4:5 by weight. Mixing may be accomplished by conventional weighing and mixing procedures. However, the smoothing compound is uniquely designed to be proportioned and mixed by automatic equipment. Static mixers or mechanical mixers may be used. Application of the compound can be made using spray, extrusion and smoothing equipment or conventional trowel and hand tools at thicknesses of from 1 ml to ½ inch without sagging.

The compound is suitable for application immediately following mixing and cures to a hard sandable surface in 4 to 16 hours. It may also be used as an adhesive for adhering rubber, wood products, fiberglass, and other materials to steel, wood, masonry and other surfaces.

The following specific example of the formulation is intended to illustrate the invention:

EXAMPLE

|  | lbs |
| --- | --- |
| Component A |  |
| Polyamide Adduct Resin | 410 |
| Polyamide Resin | 30 |
| Titanium Dioxide Resin | 50 |
| Magnesium Silicate | 300 |
| Thixotrope | 80-120 |
|  | 770-810 |
| Component B |  |
| Epoxy Resin | 500 |
| Colorant Pigment | 20 |
| Magnesium Silicate | 300 |
| Thixotrope | 80-120 |
|  | 900-920. |

In the following claims, the term epoxy resin refers to an epoxy resin of the type having an infrared absorbance spectrum as shown in FIG. 1; the term polyamide adduct resin refers to a polyamide adduct resin having an infrared absorbance spectrum as shown in FIG. 2; and the term polyamide resin refers to a polyamide resin having an infrared absorbance spectrum as shown in FIG. 3.

What is claimed is:
1. A coating composition for smoothing rough surfaces of steel, masonry, and concrete having desirable application and curing characteristics, said coating composition being prepared by mixing:
   (a) 44-45% by weight of a first component, said first component being a dispersion consisting of a polyamide adduct resin of 48-54% by weight, a poly- amide resin of 3–4% by weight, a thixotrope additive of 12–24% by weight, a titanium dioxide pigment of 5–6% by weight, and a magnesium silicate pigment of 34–38% by weight; and (b) 44–45% by weight of a second component, said second component being a dispersion consisting of an epoxy resin of 55–66% by weight, a thixotrope additive of 10–20% by weight, a colorant pigment of 2–4% by weight, and a magnesium silicate pigment of 31–35% by weight.

2. A coating composition as recited in claim 1 wherein said first component is prepared by:

(a) dispersing said polyamide adduct resin, said polyamide resin, and said thixotrope additive with a high speed disperser until the resulting mixture is heated to 140°–150° F. by the mixing process;

(b) dispersing said pigments and said resulting mixture with a high speed disperser until the resulting dispersion has a minimum fineness of grind of 5 on the Hegmas Scale, said resulting dispersion being cooled as necessary to keep the temperature under 145° F. during said dispersing; and (c) cooling said resulting dispersion to 60°–70° F. for 24 hours before use in preparing said coating compound; and wherein said second component is prepared by:

(a) dispersing said epoxy resin and said thixotrope additive with a high speed disperser until the resulting mixture is heated to 140°–150° F. by the mixing process;

(b) dispersing said pigments and said resulting mixture with a high speed disperser until the resulting dispersion has a minimum fineness of grind of 5 on the Hegmas Scale, said resulting dispersion being cooled as necessary to keep the temperature under 145° F. during said dispersing; and (c) cooling said resulting dispersion to 60°–70° F. for 24 hours before use in preparing said coating compound.

* * * * *